United States Patent [19]
Horn

[11] Patent Number: 6,027,282
[45] Date of Patent: Feb. 22, 2000

[54] DEVICE AND METHOD FOR CONTROLLING THE APPLICATION HEIGHT OF A ROAD FINISHER

[75] Inventor: Alfons Horn, Hadamar-Steinbach, Germany

[73] Assignee: MOBA-Mobile Automation GmbH, Elz, Germany

[21] Appl. No.: 08/969,155

[22] Filed: Nov. 12, 1997

[30] Foreign Application Priority Data

Nov. 14, 1996 [DE] Germany ............................ 196 47 150

[51] Int. Cl.$^7$ ................................................. E01C 19/22
[52] U.S. Cl. ........................... 404/75; 404/84.1; 404/84.8
[58] Field of Search ................................ 404/84.05, 84.1, 404/84.2, 84.5, 84.8, 75

[56] References Cited

U.S. PATENT DOCUMENTS

| | | | |
|---|---|---|---|
| 4,925,340 | 5/1990 | Heiser et al. | 404/75 |
| 5,009,544 | 4/1991 | Chaize | 404/72 |
| 5,356,238 | 10/1994 | Musil et al. | 404/84.1 |
| 5,393,167 | 2/1995 | Fujita et al. | 404/84.1 |
| 5,401,115 | 3/1995 | Musil et al. | 404/72 |
| 5,549,412 | 8/1996 | Malone | 404/84.1 |
| 5,752,783 | 5/1998 | Malone | 404/84.2 |

FOREIGN PATENT DOCUMENTS

| | | |
|---|---|---|
| 0542 297 A1 | 11/1992 | European Pat. Off. . |
| 3535362 | 3/1987 | Germany . |
| 689 03 706 | 7/1993 | Germany . |

Primary Examiner—James A. Lisehora
Attorney, Agent, or Firm—Duft, Graziano & Forest, P.C.

[57] ABSTRACT

A control device for controlling the application of a material which is adapted to be applied to a subgrade by means of a road finisher, said road finisher comprising a tractor and a floating screed, which is attached by means of at least one drawarm to the tractor in such a way that said screed is arranged behind said tractor in the direction in which the road finisher is moving when in operation, a first end of said at least one drawarm being secured to the tractor by means of a vertically adjustable coupling device, and a second end of said at least one drawarm being rigidly secured to the floating screed, said control device comprising a device for detecting the height of a screed edge in relation to a reference height, said screed edge being the rear lower edge of the screed in the direction of movement. The control device further comprises a device for detecting the inclination of said at least one drawarm in relation to a reference plane. A device for controlling the height of the vertically adjustable coupling device controls the height of said vertically adjustable coupling device on the basis of the detected inclination and the detected height of the rear lower edge of the screed.

14 Claims, 3 Drawing Sheets

DEVICE AND METHOD FOR CONTROLLING THE APPLICATION HEIGHT OF A ROAD FINISHER

BACKGROUND OF THE INVENTION

1. Field of the Invention

The present invention refers to devices and methods for controlling the application height of the material to be applied to a subgrade by means of a road finisher.

2. Description of Prior Art

A conventional road finisher in which the present invention can be used is shown in FIG. 3. The road finisher comprises a tractor 10 drawing a so-called "floating screed" 12. The floating screed 12 is attached to the tractor 10 by means of two drawarms 14, only one of said drawarms being shown in FIG. 3 due to the mode of representation. The front ends of the drawarms 14 are attached to the tractor 10 via vertically adjustable means 16. Said vertically adjustable means 16 can consist e.g. of hydraulic means comprising a piston and a cylinder as well as a valve device for controlling the position of the piston in the cylinder. The second ends of the drawarms 14 have rigidly secured thereto the floating screed 12.

When the road finisher is in operation, the drawarm 14 is attached to the tractor 10 only by means of the vertically adjustable coupling device 16. In order to permit transport of the road finisher without operation thereof, the second end of the drawarm can be arrested by means of an arresting device 18. When the road finisher is in operation, this arresting device 18 does not influence the movability of the second end of the drawarm 14.

The screed 12 is therefore connected to the tractor 10 via the drawarm 14 and a drawpoint, said drawpoint being adjustable via the vertically adjustable coupling device 16. According to the angle adjusted at the drawarm 14, the screed floats on the material to be applied.

The road finisher additionally includes a material spreading screw 20 by means of which the fed material to be applied is distributed over the width of the road to be built.

The application height of the material to be applied is normally supervised by a height control. Application height control during discharge of asphalt material by the road finisher is usually carried out with the aid of levelling systems using one of the following sensors for sensing the height: potentiometer sensor, ultrasonic sensors or laser receivers. The height sensor is fixedly connected to the screed through adequate holding means having integrated therein height adjustment means in most cases. In accordance with the prior art, the height sensor is normally arranged adjacent the side plate of the screed 12 approximately on one level with the material spreading screw 20. This mode of arrangement of a height sensor 30 is shown in FIG. 4. The height sensor 30 measures the height in relation to an associated reference 32. This reference is normally defined by a taut rope or by a taut wire. Alternatively, kerbs or the ground may serve as a reference. The height sensor 30 is arranged such that it can detect the height in relation to the reference arranged adjacent the road to be built.

FIG. 4 shows the drawarm 14 having the screed 12 attached thereto, for two different inclinations of the drawarm 14. As can be seen in FIG. 4, a change in the inclination of the drawarm 14 and, consequently, of the screed 12 can be caused by displacing the drawpoint by means of the vertically adjustable coupling device 16. Such an displacement of the drawpoint can be brought about by a valve adjustment of the vertically adjustable coupling device 16 or by surface irregularities. As can additionally be seen from FIG. 4, such a change in the inclination of the drawarm 14 and, consequently, of the screed 12 directly results in a corresponding change of height at the height sensor 30 in relation to the reference 32 associated therewith. As shown in FIG. 4, a change in the inclination of the drawarm 14 causes the detected height to change from h1, cf. left section of FIG. 4, to h2, cf. right section of FIG. 4. The measured value detected by the height sensor 30 changes from h1 to h2 immediately after the displacement of the drawpoint.

In FIG. 5, the basic structural design of a known height control is shown. The height sensor 30 detects an actual height value. This actual height value is compared with a target height value. A height controller 40 produces as a result of this comparison a control variable for the vertically adjustable coupling device, i.e. a control variable for the drawpoint valve 42 for adjusting the drawpoint. In the known method, the drawpoint is controlled by means of the detected height.

The correction of a control deviation is carried out in the known method as follows. The height controller 40 serves as a drawpoint controller and causes a displacement of the drawpoint. Due to the resultant adjustment of the inclination of the drawarm 14, the screed 12 floats up and down with a time delay. Still existing deviations from the target height value are corrected by the height controller by a renewed displacement of the drawarm. As soon as the drawarm is displaced, the height controller 40 again acts as a drawpoint controller until a stable adjustment of the drawpoint position has been obtained. The above-mentioned steps are repeated until the target height value is obtained.

In the control system described, the height sensor 30 is arranged adjacent the side plate of the screed approximately on one level with the material spreading screw, since a drawpoint displacement is not recognized directly when the height is sensed at the rear edge of the screed. The drawpoint control circuit would then not have a direct feedback and cause a movement up to the limit stop of the drawpoint displacement. This would result in a formation of waves in the material applied. It follows that, when height control according to FIG. 5, which represents the current prior art, is carried out, the height must not be sensed at the rear edge of the screed, although this would be the appropriate location for an exact detection of height.

In FIG. 6 a problem is shown which arises in the case of all finishers equipped with a levelling system in which the sensor for sensing the height is arranged at the position described hereinbefore. In FIG. 6, the screed 12 is shown schematically for various drawpoint adjustments. The drawarm is only shown schematically in the form of lines. Although the rear edge of the screed occupies three different height positions H1, H2 and H3, the height sensor 30, which is arranged at the position of the material spreading screw 20, measures in each case the same height H in relation to its reference 32. Due to temperature variations in the material to be applied or due to speed variations of the road finisher, slight tilting of the drawarm and, consequently, also of the screed around the measurement point of the height sensor 30 may occur. This tilting finds expression in a long-time drift of the height of the material applied. Experiments carried out in practice have shown that the height of the material applied may vary up to 1 cm over a period of several hours. In practice, this long-time drift must be corrected in that, e.g. the operating staff, regulary checks the height of the material applied.

SUMMARY OF THE INVENTION

It is an object of the present invention to provide a device and a method which are used for controlling the application height of the material that is to be applied to a subgrade by means of a road finisher and which permit a direct and very exact determination and control of the application height.

In accordance with a first aspect, the present invention provides a control device for controlling the application of a material which is adapted to be applied to a subgrade by means of a road finisher, the road finisher comprising a tractor and a floating screed, which is attached by means of at least one drawarm to the tractor in such a way that the screed is arranged behind the tractor in the direction in which the road finisher is moving when in operation, a first end of the at least one drawarm being secured to the tractor by means of a vertically adjustable coupling device, and a second end of the at least one drawarm being rigidly secured to the floating screed. The control device has a device for detecting the height in the area of a screed edge in relation to a reference height, the screed edge being the rear lower edge of the screed in the direction of movement, a device for detecting the inclination of the at least one drawarm in relation to a reference plane, and a device for controlling the height of the vertically adjustable coupling device on the basis of the detected inclination and the detected height of the rear lower edge of the screed, the device forming on the basis of the detected height of the rear lower screed edge and on the basis of a target height value a target inclination value and producing on the basis of a comparison between the target inclination value and the detected inclination a control signal for the vertically adjustable coupling device.

In accordance with a second aspect, the present invention provides a method for controlling the height of a vertically adjustable coupling device of a road finisher comprising a tractor and a floating screed, which is attached by means of at least one drawarm to the tractor in such a way that the screed is arranged behind the tractor in the direction in which the road finisher is moving when in operation, a first end of the at least one drawarm being secured to the tractor by means of the vertically adjustable coupling device, and a second end of the at least one drawarm being rigidly secured to the floating screed. The inventive method comprises the steps of detecting the height in the area of a screed edge in relation to a reference height, the screed edge being the rear lower edge of the screed in the direction of movement, detecting the inclination of the at least one drawarm in relation to a reference plane, and controlling the height of the vertically adjustable coupling device on the basis of the detected inclination and the detected height of the rear lower edge of the screed by forming a target inclination value on the basis of the detected height of the rear lower screed edge and on the basis of a target height value and producing a control signal for the vertically adjustable coupling device on the basis of a comparison between the target inclination value and the detected inclination.

In accordance with a preferred embodiment of the device according to the present invention, a height deviation value is formed on the basis of the difference between the detected height and a target height value, a target-inclination-value modification value being determined on the basis of the height deviation value. A target inclination value is then determined on the basis of the target-inclination-value modification value. The target inclination value is compared with the detected inclination, a control signal for the vertically adjustable coupling device being then produced on the basis of this comparison.

The control concept according to the present invention is based on the idea of providing a separate drawpoint controller. Variations in the application height, target value or actual value, do not influence the drawpoint directly when the control according to the present invention is used. The application height can therefore be measured at the point where it can be determined directly and very precisely. This point is located in the area of the screed edge constituting the rear lower screed edge in the direction of movement. The separate drawpoint controller prevents the formation of waves in the material applied.

The present inveniton is additionally based on the reflection that different control and correction mechanisms must be used for different disturbance variables affecting the control circuit that is used for controlling the application height. The control circuit is affected by various disturbance variables. These disturbance variables include surface irregularities, temperature variations of the material, the tamping frequency of the screed and the travelling speed of the road finisher. Surface irregularities, for example, must be compensated for very rapidly, since, otherwise, said irregularities are copied by the road finisher with a certain amount of damping. A drawarm inclination which is independent of surface irregularities would therefore have a very positive effect on the application behaviour. This would result in a high degree of the evenness of the road surface and in a non-integration of surface irregularities provided that no variations in the inclination of the road occur. Temperature variations in the material to be applied cause, however, only very slow changes in the application height.

On the basis of the above reflections and in view of the problem arising when conventional height control means are used, said problem being shown in FIG. 6, the control circuit according to the present invention is separated such that the actual height value does not act directly on the drawpoint control.

The control method according to the present invention shows a plurality of advantages in comparison with the prior art. The height supervision can be carried out at time intervals which are much longer than those required in the case of known control methods. In addition, the height sensor can determine the height value more precisely due to longer measurement times. A correction of the application height by the operating staff, e.g. for the purpose of eliminating the long-time drift, can be dispensed with. Furthermore, the application behaviour is self-optimizing when the control method according to the present invention is used.

Valve parameters for the drawpoint are determined automatically. By means of the devices and methods according to the present invention, ground contours can be compensated for more effectively.

Further developments of the present invention, are disclosed in the dependent claims.

BRIEF DESCRIPTION OF THE DRAWINGS

In the following, preferred embodiments of the present invention will be explained in detail with reference to the drawings enclosed, in which.

DESCRIPTION OF PREFERRED EMBODIMENTS OF THE INVENTION

Figure 1:
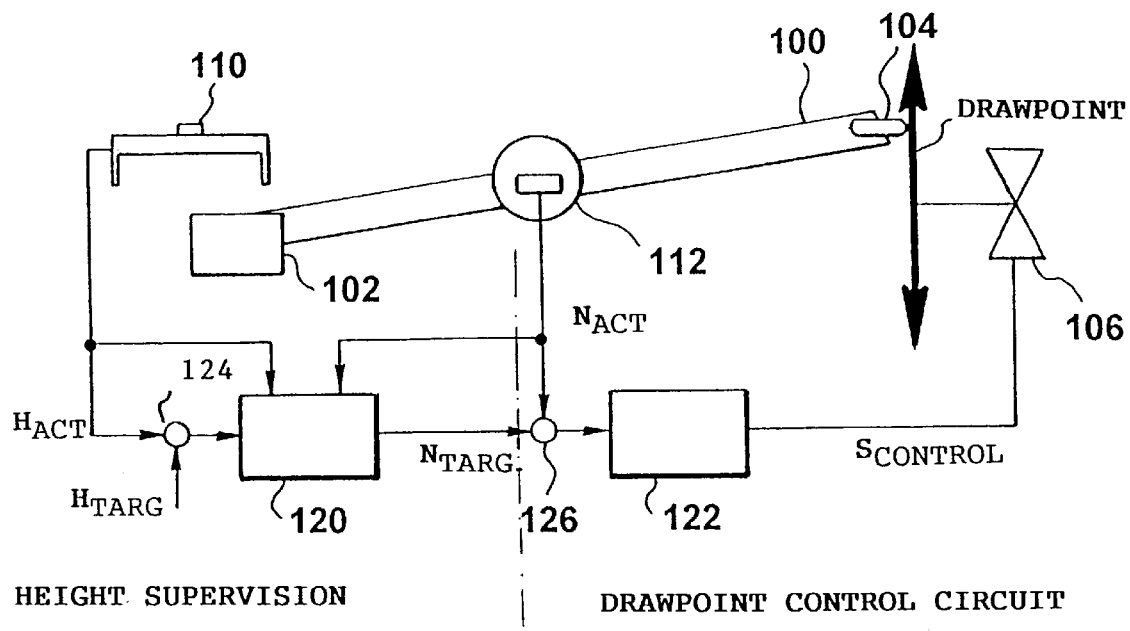
FIG. 1 shows a schematic representation of a preferred embodiment of a control device according to the present invention.

FIG. 1 shows schematically a preferred embodiment of the control concept according to the present invention. According to this control concept, the control circuit for controlling the application height is subdivided in such a way that the actual height value does not act directly on the drawpoint control.

FIG. 1 shows schematically a drawarm 100 and a free-floating screed 102. Although the devices and methods according to the present invention are described hereinbelow on the basis of one drawarm, it is apparent that the present invention can also be applied to a plurality of drawarms, normally two; in this case, a separate control may be provided for each drawarm. The drawarm 100 is, like in known road finishers, secured to a tractor via a vertically adjustable coupling device 104. By means of said vertically adjustable coupling device 104, the drawpoint, i.e. the height at which the drawarm is secured to the tractor, can be adjsted through a drawpoint valve 106.

According to the present invention, a height sensor 110 is arranged in such a way that it is capable of detecting the height of the screed 102 in relation to a reference in the area of the rear edge of the screed. Such a height measurement at the rear edge of the screed is referred to as "layer thickness measurement".

In accordance with the preferred embodiment, an inclination sensor 112 is arranged on or in the drawarm 100, as can be seen from the enlarged representation in the interior of the circle in FIG. 1. The inclination sensor 112 detects an inclination of the drawarm 100 relative to a horizontal. Alternatively, an inclination detection device attached to the tractor could be used; in this case, it would additionally be necessary to detect the relative angle between the tractor and the drawarm. The inclination of the drawarm could then be determined on the basis of the inclination measurement of the tractor and of the detected relative angle between the drawarm and the tractor. Furthermore, it would be possible to attach the inclination sensor to the free-floating screed, whereby the inclination of the drawarm could be detected due to the fact that the screed is rigidly connected to the drawarm.

The control device according to the present invention comprises a height supervision module 120 and a drawpoint control module 122. The height supervision module 120 is connected to the height sensor 110 directly and via a subtraction element 124. The drawpoint control module 122 is connected via a subtraction element 126 to the inclination sensor 112 and the height supervision module 120. In the embodiment shown, the height supervision module 120 is also directly connected to the inclination sensor 112. The drawpoint control module is connected to the drawpoint valve 106 for controlling the drawpoint.

The height supervision module 120 provides for the drawpoint control module a target inclination value which is to be set, said target inclination value being calculated on the basis of the height deviation, i.e. the deviation of the actual value from the target value. The inclination sensor 112 detects the inclination of the drawarm and provides the actual value for the drawpoint control module. A direct influence of the actual height value on the drawpoint control circuit does not occur. The drawpoint control module 122 then activates the drawpoint valve 106 by means of which the drawpoint and, consequently, the inclination of the drawarm are adjusted.

The height supervision module 120 is provided for recognizing deviations of the detected height value from a target height value. For this purpose, said height supervision module has supplied thereto the difference between the actual value $H_{act}$, which is detected by the height sensor 110, and the target height value $H_{targ}$. In the embodiment shown, this difference is formed by means of the subtraction element 124. In order to make things clearer, the subtraction element 124 is shown separately from the height supervision module in FIG. 1. It is, however, obvious that the subtraction element 124 may also be arranged within said height supervision module. In this case, the height values $H_{act}$ and $H_{targ}$ would be supplied directly to the height supervision module.

The difference between the height values $H_{act}$ and $H_{targ}$ represents a height deviation value $H_{deviation}$.

Making use of the height deviation value, a target inclination value $N_{targ}$, which must be observed precisely by the drawpoint control circuit, is ascertained in the height supervision module. On the basis of the predetermination of the demanded inclination value, the demanded application height is adjusted via the drawpoint control circuit.

In accordance with a preferred embodiment of the present invention, the target inclination value is determined as follows. On the basis of the ascertained height deviation value $H_{deviation}$, a target-inclination-value modification value $N_{targmod}$ is determined by means of a suitable table which is stored in the height supervision module 120. The fundamental structure of such a table is as follows:

TABLE 1

| height deviation from the target value/mm | target inclination value modification/0.01° |
|---|---|
| 0.5 | 1 |
| 1 | 2 |
| 1.5 | 3 |
| 2 | 4 |
| 2.5 | 5 |
| 3 | 6 |

The above table only shows the fundamental structure of a table. The height supervision module 120 can have stored therein additional tables which can result in a more aggressive or more moderate correction behaviour of the height adjustment after a control deviation. The height supervision module 120 may also be provided with devices permitting, if necessary, an extension or a change of the tables stored therein. Reference is made to the fact that the hardware and software elements, which are required for carrying out the methods according to the present invention and which must be included in the height supervision module 120 and in the drawpoint control module 122, are known in the field of technology.

As has been mentioned, a plurality of tables can be available in the height supervision module 120. The selection of the respective working table used can be carried out in accordance with an optimization algorithm. This algorithm orients itself according to the accomplished application behaviour subsequent to a corrected control deviation. Here it is examined how fast a control deviation can be compensated for by the control system. The following rules can be implemented in the height supervision module as software:

if $t_{time}$ for correction exceeds 20 seconds, select the next more agressive table;

if overshoot exceeds 1 mm, select the next more moderate table;

if both criteria are fulfilled, select again the next more moderate table.

By means of an algorithm of the above-mentioned type, the application behaviour of the screed can be optimized when the road finisher is in operation.

By means of the target-inclination-value modification value $N_{targmod}$, the target inclination value $N_{targ}$ is now calculated as follows:

$$N_{targ} = \text{old } N_{targ} + N_{targmod}$$

The expression "old $N_{targ}$" refers to a target inclination value predetermined at the beginning of the method according to the present invention or to the target inclination value of the respective preceding cycle.

Disturbance variables, such as temperature changes in the material, affect the application height only very slowly, i.e. with a high time constant. A high sensing rate of the height sensor 110 is therefore not necessary. On the contrary, the time available can be used for increasing the accuracy of the measurement result. A higher accuracy results, in the final analysis, in a better application result. In the height control means used according to the prior art, the sensing rate is approx. 40 measurements/second. In the case of the control concept according to the present invention, only a medium sensing rate of approx. one measurement within 5 seconds is required for the application height. The sensing rate can be a function of the height deviation, and it can be gathered from the following table:

TABLE 2

| height deviation | sensing rate |
| --- | --- |
| <1 mm | 10 sec. |
| 1 mm to 2 mm | 5 sec. |
| >2 mm | 2 sec. |

The target inclination value $N_{targ}$, which is ascertaiend in the manner described hereinbefore, is supplied to the drawpoint control module 122. In said drawpoint control module, the difference between an actual inclination value of the drawarm 100 $N_{act}$ and the target inclination value $N_{targ}$ is formed. Again for the sake of clarity, the subtraction element 126 is shown separately from the drawpoint control module 122, although the former is preferably included in the latter.

In the drawpoint control module 122, a control variable, i.e. a control signal $S_{control}$, for the drawpoint valve 106 is determined on the basis of the values $N_{act}$ and $N_{targ}$. By means of this control signal $S_{control}$, the drawpoint is changed via the vertically adjustable coupling device 104 and the inclination of the drawarm 100 is adjusted by this change of drawpoint.

In view of the fact that the drawpoint is controlled by the separate drawpoint control module 122, the height sensor 110 has no direct influence on the drawpoint control. For effecting drawpoint control, a second sensor is, however, used, viz. the inclination sensor 112, which detects the inclination of the drawarm. This inclination sensor only has the function of detecting inclination variations in relation to the earth's surface, i.e. to the horizontal. The inclination sensor is not used for drawing conclusions with regard to the application height. The point of decisive importance is that the inclination once set at the drawarm is observed precisely by the drawpoint control circuit. Due to the predetermination of the demanded inclination value, the demanded application height is adjusted via the drawpoint control circuit. Disturbance variables which may influence the application process, such as variations of the drawpoint caused by an uneven foundation, are to be compensated for rapidly by the drawpoint control circuit. The respective control variable $S_{control}$ required for the control process is obtained by forming the difference between the actual inclination value and the target inclination value.

With the aid of height supervision and the drawpoint control circuit, essentially the following disturbance variables are compensated for: temperature variations in the material to be applied; variations of the application rate, i.e. changes of the travelling speed of the road finisher; variations of the tamping frequency, i.e. variations of the frequency of the vibrator in corporated in the free-floating screed; and changes in e the inclination of the road.

Figure 2:
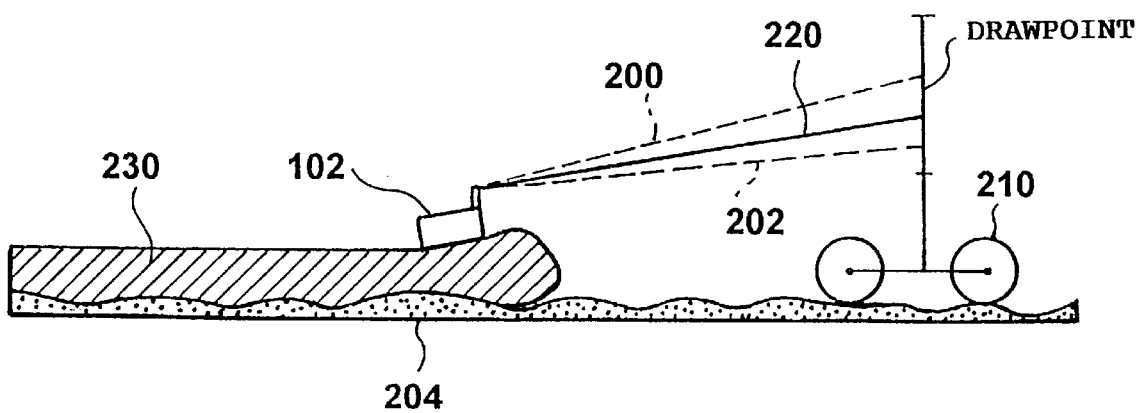
FIG. 2 shows a schematic representation for explaining an advantage of the control method according to the present invention.
Figure 3:
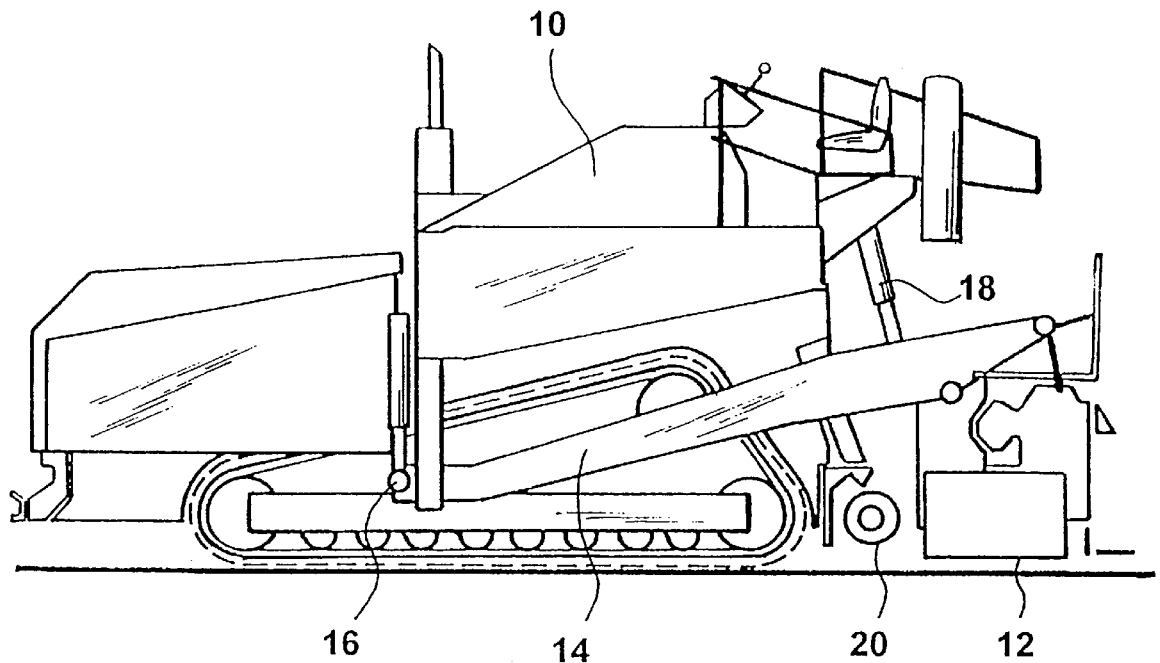
FIG. 3 shows a side view of a known road finisher.
Figure 4:
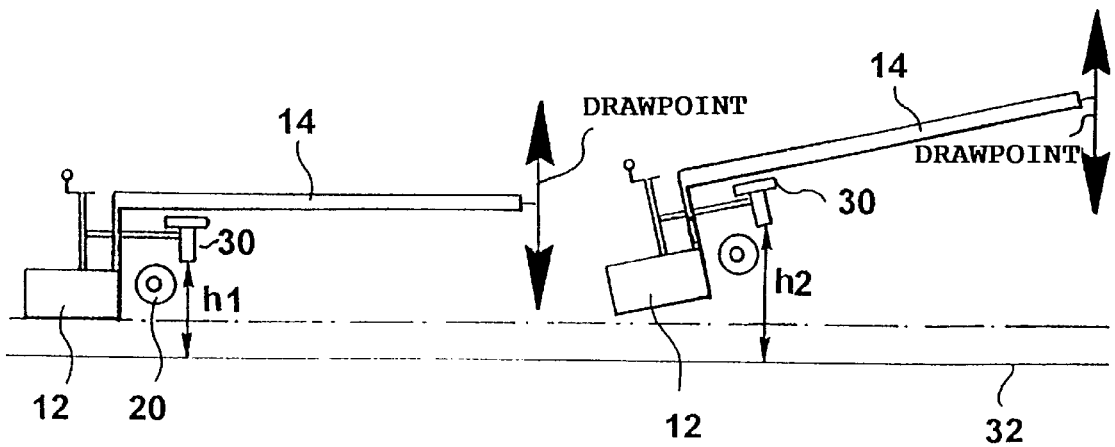
FIG. 4 shows schematic representations for demonstrating the height detection of a known road finisher.
Figure 5:
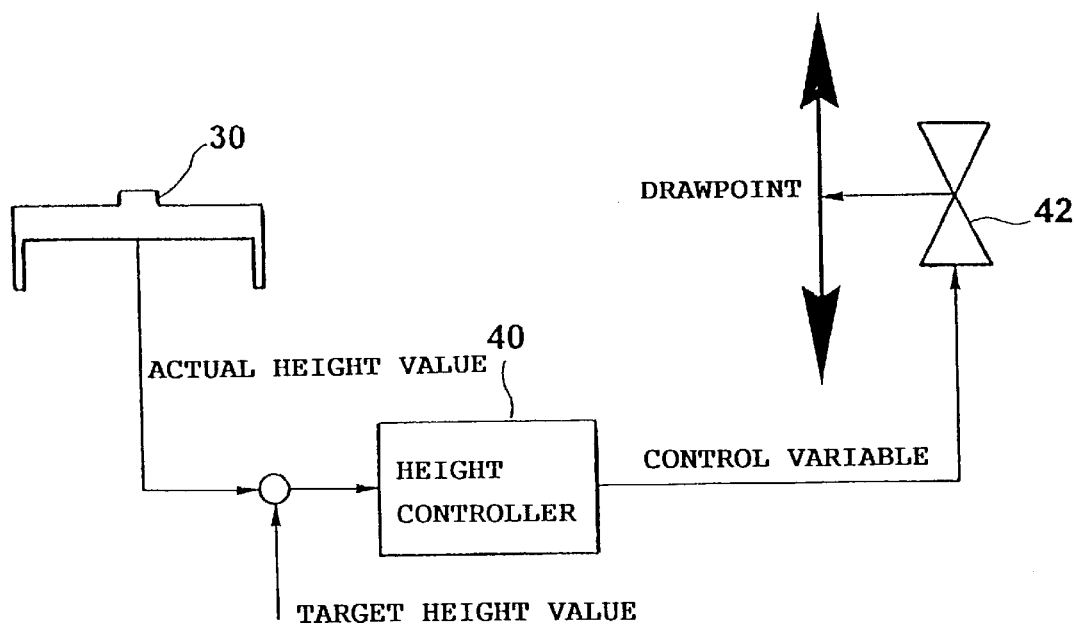
FIG. 5 shows a schematic diagram representing a known height control.
Figure 6:
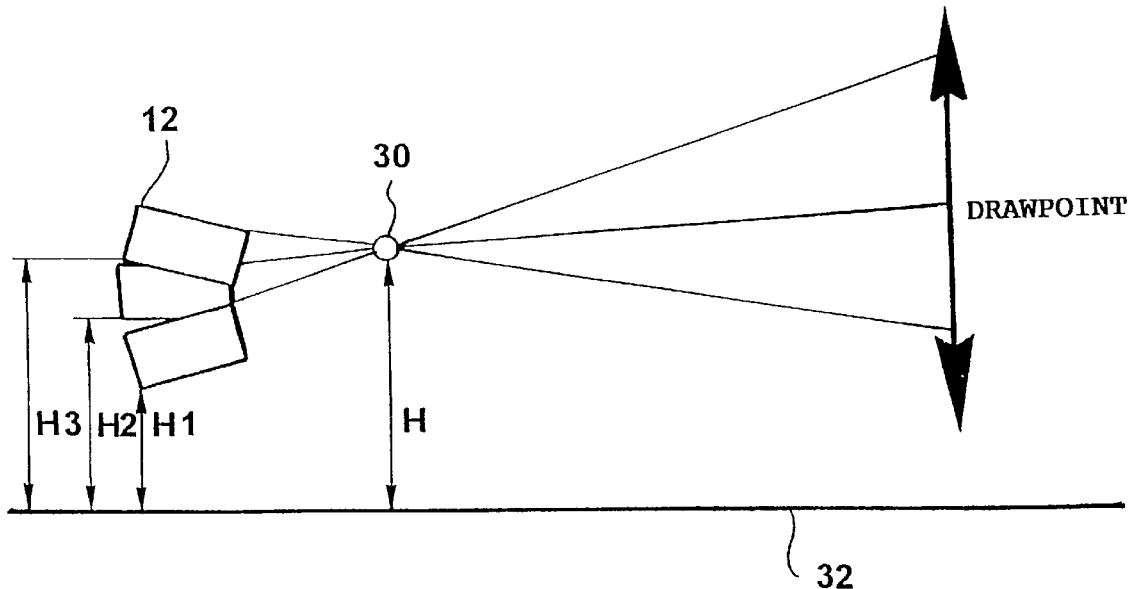
FIG. 6 shows a diagram illustrating a problem that arises in known height control devices.

In FIG. 2, an uneven foundation, to which a road surface is to be applied, is shown. Without drawpoint control via an inclination sensor, the surface irregularities directly influence the drawpoint, as can be seen from the dashed lines 200 and 202 in FIG. 2. The dashed lines 200 and 202 represent the drawarm inclination range in the case of an uneven foundation 204, said drawarm inclination range existing if no compensation or drawpoint control according to the present invention is used. This drawarm inclination range originates from the fact that the tractor 210 of the road finisher adopts the height variations of the ground, whereby the drawpoint, i.e. the inclination of the drawarm, is changed. Due to these inclination variations, the surface irregularities are directly copied by the road finisher with a certain amount of damping. The solid line 220 shows the drawarm inclination with inclination compensation according to the present invention. Due to the respective readjustment of the drawpoint in such a way that the drawarm has the desired target inclination, i.e. that the inclination of the drawarm remains constant, the surface irregularities are not copied, and in this way an even surface of the applied material 230 is obtained. The drawpoint control is, consequently, also able to compensate disturbance variables such as surface irregularities or leakage of the hydraulic cylinder.

Together with the inclination sensor, two additional sensors can be provided for determining the acceleration in the x and in the y direction. The x direction is the direction in which the road finisher moves and the y direction is the direction at right angles to said direction of movement. By means of these further sensors, additional information and compensations can be obtained.

By means of the x-direction acceleration sensor, travelling speed variations of the road finisher, primarily starting and stopping of said road finisher, are detected. In view of the fact that the inclination sensor reacts to accelerations, an adequate compensation can be carried out.

By means of the y-acceleration sensor, vibrations of the screed can be detected. These vibrations originate from the vibrator which is incorporated in the screed and which is formed e.g. by an unbalanced motor. With the aid of the information obtained in this way, various filters for calculating the inclination can be adjusted.

When the road finisher is at rest, the vibration of the screed is switched off. When the information provided by the x- and y-acceleration sensors is combined, a start-stop statement with regard to the operation of the road finisher is obtained. This statement can be used for preventing a correction of the target inclination value when the road finisher is at rest. When the acceleration sensors are arranged side by side with the inclination sensor element in the inclination sensor device, which is secured to the drawarm, the signals detected by the acceleration sensors can be supplied to the height supervision module 120 via the connection between the sensor device 112 and the height supervision module 120.

Reference should be made to the fact that the accuracy of the inclination sensor is not of decisive importance with regard to the control. Factors which are, however, important are the reproducability as well as a low zero and amplification drift.

In accordance with the preferred embodiment of the present invention, an inclination sensor has been used, which measures the absolute inclination of the drawarm in relation to the earth's surface. The inclination of the drawarm in relation to the earth's surface is decisive with regard to the control quality in the case of this embodiment. In accordance with an alternative embodiment, an angle sensor could be used instead of the inclination sensor, said angle sensor detecting the inclination of the drawarm in relation to a fixed reference. This fixed reference could, for example, be the reference on the basis of which the height sensor operates.

When an external start/stop signal is provided, the above-mentioned acceleration sensors used for detecting a standstill of the road finisher can be dispensed with. Furthermore, it is possible that an analysis of the inclination measurement values of the inclination sensor already suffices to make a start/stop statement.

The height sensors that can be used in accordance with the present invention are a single ultrasonic sensor, a plurality of ultrasonic sensors, a potentiometer sensor, or a laser receiver.

Hence, the present invention provides a device and a method for controlling the application height of a material to be applied to a subgrade, which are provided with separate height supervision and drawpoint control. According to the present invention, the application height is detected at the rear edge of the screed. Furthermore, the optimum inclination adjustment for the drawarm is determined. The height supervision according to the present invention requires much lower sensing rates than known height supervisions. Furthermore, the height value can be determined more exactly by means of the height sensor due to longer measurement times. A correction of the application height by the operating staff is not necessary. The application behaviour is self-optimizing when the system according to the present invention is used. In addition, valve parameters for the drawpoint are determined automatically. Hence, ground contours and other disturbing parameters can be compensated for more effectively than has hitherto been possible by means of known application height control systems.

In the embodiment described, the device for detecting the height in the area of the screed edge, which constitutes the rear lower screed edge in the direction of movement, consists of an ultrasonic sensor. Instead of said one ultrasonic sensor, it is also possible to use a plurality of ultrasonic sensors or a potentiometer sensor or a laser receiver for the purpose of height detection. In accordance with another possibility, the absolute height of the rear lower edge of the screed can also be detected by the so-called GPS (global positioning system). The GPS is normally used for determining the position of an object in the x-y plane. For the purpose of the present invention, the GPS can, however, also be used for height determination in the z direction.

What is claimed is:

1. A control device for controlling the application of a material which is adapted to be applied to a subgrade by means of a road finisher, said road finisher comprising a tractor and a floating screed, which is attached by means of at least one drawarm to the tractor in such a way that said screed is arranged behind said tractor in the direction in which the road finisher is moving when in operation, a first end of said at least one drawarm being secured to the tractor by means of a vertically adjustable coupling device, and a second end of said at least one drawarm being rigidly secured to the floating screed, said control device having the following features:

a device for detecting the height in the area of a screed edge in relation to a reference height, said screed edge being the rear lower edge of the screed in the direction of movement;

a device for detecting the inclination of said at least one drawarm in relation to a reference plane; and a device for controlling the height of the vertically adjustable coupling device on the basis of the detected inclination and the detected height of the rear lower edge of the screed, wherein said device forms a height deviation value on the basis of the difference between the detected height and the target height value, determines a target-inclination-value modification value on the basis of at least a stored table in which each height deviation value has associated therewith a target-inclination-value modification value, determines a target inclination value on the basis of said target-inclination-value modification value, and produces on the basis of a comparison between the target inclination value and the detected inclination a control signal for the vertically adjustable coupling device.

2. A control device according to claim 1, wherein the device for detecting the height in the area of the screed edge constituting the rear lower screed edge in the direction of movement comprises an ultrasonic sensor, a plurality of ultrasonic sensors, a potentiometer sensor, or a laser receiver.

3. A control device according to claim 1, wherein the device for detecting the height in the area of the screed edge constituting the rear lower screed edge in the direction of movement consists of a global positioning system.

4. A control device according to claim 1, wherein the device for detecting the inclination of the at least one drawarm comprises an inclination sensor detecting the inclination of the at least one drawarm in relation to a horizontal reference plane.

5. A control device according to claim 1, wherein the device for detecting the inclination of the at least one drawarm comprises an angle sensor detecting the inclination of said at least one drawarm with regard to a reference line.

6. A control device according to claim 1, wherein, depending on operating conditions, the device for controlling the height of the vertically adjustable coupling device accesses a respective table for determining the target-inclination-value modification value.

7. A control device according to claim 6, which additionally includes a device for determining changes in the travelling speed of the road finisher.

8. A control device according to claim 1, which additionally includes a device for detecting a standstill of the road finisher and a device for automatically switching off the device for controlling the height of the vertically adjustable coupling device if such standstill of the road finisher is detected.

9. A control device according to claim 8, wherein the device for detecting a standstill of the road finisher comprises at least one sensor for detecting accelerations in the direction of movement of the road finisher and at right angles to said direction of movement.

10. A method for controlling the height of a vertically adjustable coupling device of a road finisher comprising a tractor and a floating screed, which is attached by means of at least one drawarm to the tractor in such a way that said screed is arranged behind said tractor in the direction in which the road finisher is moving when in operation, a first end of said at least one drawarm being secured to the tractor by means of the vertically adjustable coupling device, and a second end of said at least one drawarm being rigidly secured to the floating screed, said method comprising the following steps which are repeated cyclically in succession:
- a) detecting the height in the area of a screed edge in relation to a reference height, said screed edge being the rear lower edge of the screed in the direction of movement;
- b) detecting the inclination of said at least one drawarm in relation to a reference plane; and
- c) controlling the height of the vertically adjustable coupling device on the basis of the detected inclination and the detected height of the rear lower edge of the screed by
  - c1) forming a height deviation value on the basis of the detected height and a target height,
  - c2) determining a target-inclination-value modification value on the basis of said height deviation value making use of stored tables,
  - c3) determining a target inclination value on the basis of said target-inclination-value modification value and a target inclination value of a preceding cycle or a predetermined target inclination value,
  - c4) producing a control signal for the vertically adjustable coupling device on the basis of a comparison between the target inclination value and the detected inclination; and
  - c5) controlling the height of the vertically adjustable coupling device by means of said control signal.

11. A method according to claim 10, wherein in step a) the height of a screed edge constituting the rear lower edge of the screed in the direction of movement is detected in relation to a ropelike device serving as a reference.

12. A method according to claim 10, wherein in step b) the inclination is detected in relation to a horizontal by means of an inclination sensor.

13. A method according to claim 11, wherein in step b) the inclination is detected by means of an angle sensor, said inclination being detected in relation to the ropelike device serving as a reference.

14. A method according to claim 10, comprising in addition the steps of detecting a standstill of the road finisher and terminating the execution of step c), if a standstill of the road finisher is detected.

* * * * *